Oct. 19, 1965   M. J. LYNCH   3,212,153
SNAPHOOKS
Filed Dec. 13, 1963
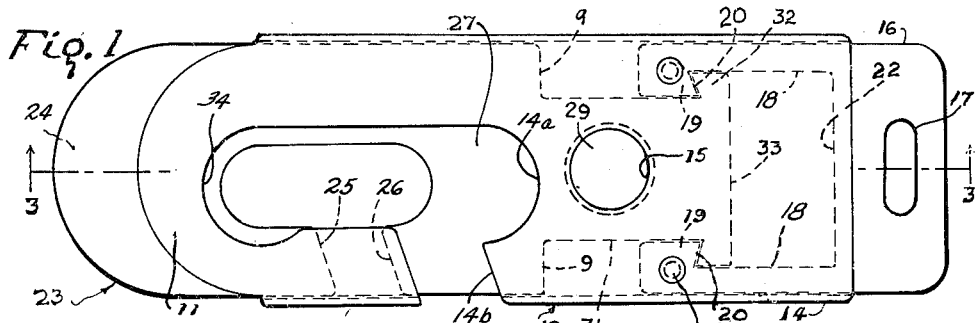
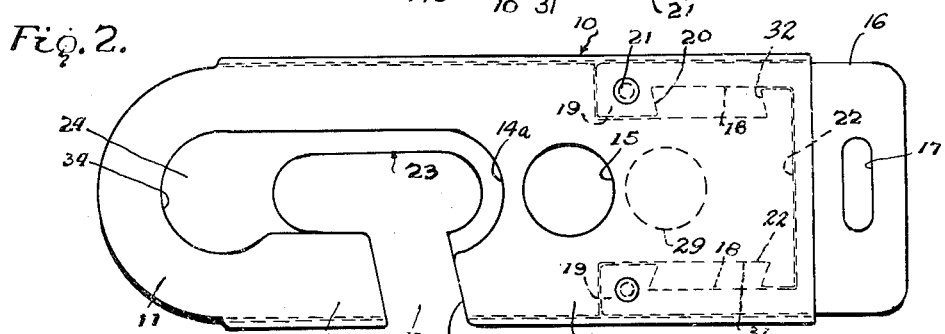
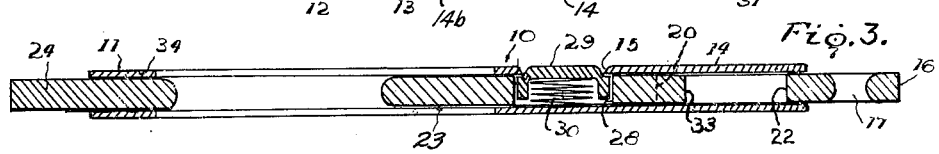
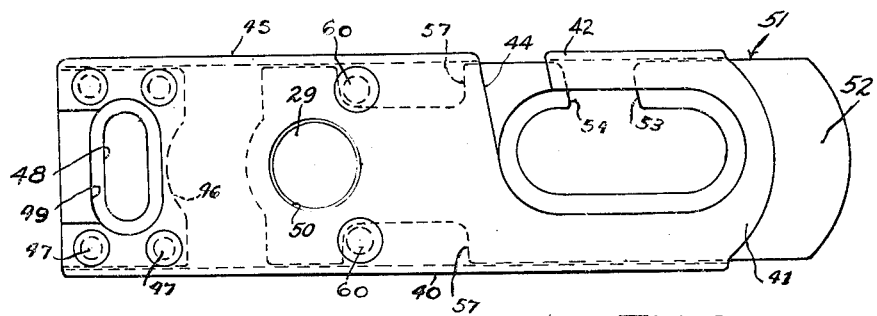
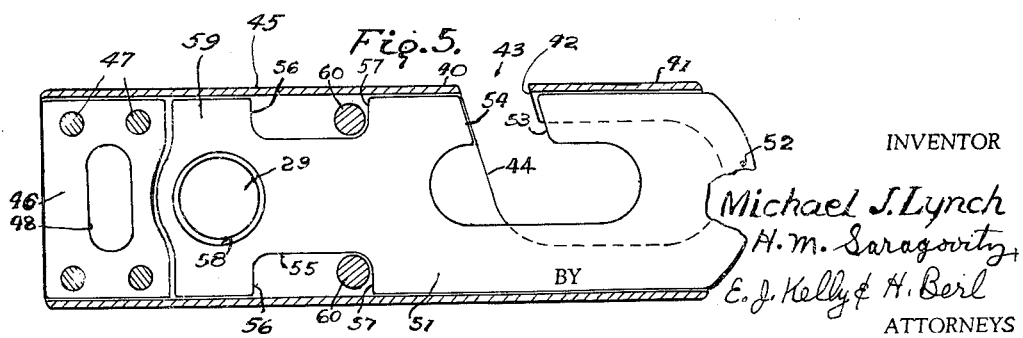
INVENTOR
Michael J. Lynch
H. M. Saragovitz,
BY E. J. Kelly & H. Beil
ATTORNEYS United States Patent Office 3,212,153
Patented Oct. 19, 1965

3,212,153
SNAPHOOKS
Michael J. Lynch, Roslindale, Mass., assignor to the
United States of America as represented by the Secretary of the Army
Filed Dec. 13, 1963, Ser. No. 330,207
5 Claims. (Cl. 24—238)
(Granted under Title 35, U.S. Code (1952), sec. 266)

The invention described herein may be manufactured and used by or for the Government for governmental purposes, without the payment to me of any royalty thereon.

The invention relates to snaphooks and more particularly to snaphooks of the type wherein the hook portion is slidable in a shell to and from open and closed positions. Specifically, the invention relates to an improvement over the type of snaphook disclosed in U.S. Patent No. 279,477, wherein the hook is rearwardly slidable in a shell to the open position and forwardly slidable in the shell to the closed position. This is the reverse of the normal operation of sliding snaphooks. In use, the snaphook of the invention is intended to connect the static line of a parachute, either personnel or cargo, but particularly the latter, to the anchor cable in the aircraft so that the parachute is automatically released and opened upon tensioning of the static line. In the instance of cargo parachutes the anchor line comprises a steel cable and at the time of the parachute release imposes considerable strain and abrasion on the hook parts. In the instance of the conventional hook it has been found that the steel cable tends to abrade the metal shell of the hook to the point where it is unfit for re-use. This abrading is particularly severe after the static line has pulled the bag off of the parachute and the bag is whipped around by the slip stream prior to being hauled into the aeroplane. The abrasion by the anchor cable at this time can be severe enough to wear away the bight portion of the shell to the extent that it will not pull the shell far enough forward for the latch of the shell and hook to engage to secure the twain in the closed position. Also, even slight abrasion may cause sticking of the parts and cause the fastener to be unsafe for use with personnel parachutes.

With the foregoing in view, it is an object of the invention to provide a improved snap fastener of the class described.

A further object is to provide such an improved snap fastener wherein the metal shell of the fastener is protected against abrasion by the static line at all times.

A further object is to provide novel means for securing the solid metal hook portion in the shell and for limiting its movement therein.

A further object is to provide in such a last described fastener novel configurations of the hook shank and rigid means carried by the shell providing stop means for limiting the sliding movement of the hook in both directions.

Other objects and advantages reside in the particular structure of the fastener, the structure of the several elements of the same, combinations and sub-combinations of such elements, all of which will be readily apparent to those skilled in the art upon reference to the attached drawing showing two species of the invention and to the following specification wherein the invention is described and claimed.

In the drawing:
FIGURE 1 is an elevational view of one species of the invention, the parts being shown in the closed position;
FIGURE 2 is like view of the same species, the parts being shown in the open position;
FIGURE 3 is a longitudinal sectional view taken substantially in the plane of the line 3—3 of FIGURE 1;
FIGURE 4 is an elevational view like FIGURE 1 but showing a modification of the invention; and
FIGURE 5 is a horizontal sectional view of the modification of FIGURE 4 but showing the parts in the open position.

Referring specifically to the drawin, wherein like reference characters designate like parts in all views, and referring at first to the species of the invention illustrated in FIGURES 1 to 3, 10 designates a metal shell of generally flat, cylindrical shape. Shell 10 is hook-shaped and comprises a bight 11, a bill 12 and a hook shank 14 having an inwardly curved forward portion 14a providing a downwardly depending shoulder 14b. A hook opening 13 is provided between the bill 12 and the shoulder 14b. An opening 15 is formed through the top surface of the shank 14 centrally thereof in the region of the hook opening. The purpose of this opening or hole will be apparent hereinafter.

A solid metal member 16 of flat configuration is fixed in the rear end of shank 14 and projects rearwardly thereof. The rear projecting portion may be formed with a hole 17 therethrough for securing the snaphook to the static line. The member 16 includes two integral legs 18 which extend forwardly into the shell shank 14 along the side wall thereof. Such legs 18 terminate in oppositely inwardly directed feet 19 providing rearwardly facing shoulders 20. The member 16 is secured to the shell 10 in any suitable manner such as welding or, as shown, by the solid steel pins 21 which extend through the shell 10 and feet 19 of the member 16. The rear end of shell 10 is closed by the forward edge 22 of member 16 which lies between the legs 18 in facing relation to the shoulders 20.

The solid metal hook is generally designated at 23 and comprise an abnormally thick bight 24 terminating at one side in a bill 25 which is spaced from a projection 26 of the hook shank to register with like spaced parts of the shell to define the hook opening 13. The hook shank 27 is formed with a hole 28 therethrough which at times is registered with the opening 15 of the shell, specifically, these holes register when the parts are in the closed position of FIGURES 1 and 3. A button latch 29 is vertically slidable in the holes 28 and 15 and is loaded to the uppermost or latching position by an expansive coil spring 30 disposed within the hollow button and between the button and the floor of the shell 10. When the parts are in the open position, FIGURE 2, the top wall of the shell overlies the button 29 and maintains the same in the retracted position entirely within the hole 28. However, when the parts are moved to the closed position, FIGURE 1, the upper part of the button, which is slightly reduced in size, springs up into the registered hole 15 to releasably latch the parts in the closed positions. The hole 15 is slightly smaller in diameter than the hole 28 so only the reduced top portion of the button 29 may project thereinto whereby to prevent loss of the button. The solid hook shank is reduced withwise to comprise a neck 31 which at the front is formed with two rearwardly facing shoulders 9. The rear end of the shank is formed with two laterally outwardly extending shoulders 32 which oppose the shoulders 20 of the member 16. The rear end edge 33 of the hook shank is straight and opposes the forward edge 22 of member 16.

From the foregoing, it is apparent that the solid hook 23 is free to slide forwardly and rearwardly in the shell 10 between the limits imposed by the shoulders 20 and front edge 22 of the anchor member 16. In operation, with the parts in the FIGURE 2 position, the hook opening 13 is passed over the anchor cable, the shell 10 is pulled downwardly to bring the anchor cable into engagement with the inner edge of the hook bight 24. Continued pulling pulls the hook 23 forwardly until the hook opening 13 is completely closed at which time the latch button 29 springs into latching position and the shoulders 20 and 32 become abutted. At no time does the anchor cable abut the bight 11 of the shell because the inner edge 34 of the same is disposed substantially forwardly of the like edge of the hook bight 24. Thus, even when the static line is gyrating in the slip stream the shell bight 11 is protected against abrasion. Of course, the hook bight 24 is exposed to abrasion but as this is solid high tempered metal or metal alloy it is able to withstand such abrasive action without damage.

The species of FIGURES 4 and 5 is quite similar to that of the first described species. Here a similar flat cylindrical shell 40 is formed with a relatively thin hook bight 41 which terminates at one side in a hook bill 42 which is spaced from a forward edge portion 44 of the shell shank 45 to define the hook opening 43. The rear end of the shell 40 is closed by a solid metal member 46 which is secured in position by any suitable means such as the rivets or pins 47. A hole 48 is formed through the member 46 and somewhat larger concentric holes 49 are formed through the top and bottom walls of the shell 40 in concentric relation to the hole 48. By providing the enlarged holes 49 the edges thereof are protected from abrasion by the static line when the same is attached through the registering holes 48, 49. Between the member 46 and the front edge 44, the shell shank 45 is formed with a hole 50 for the latch button 29 which is the same as in the first described species.

Hook 51 is formed of solid metal as before and includes an unusually thick bight 52 which terminates at one side to provide a bill 53 which is spaced from a forwardly projecting part 54 of the hook shank to provide a hook opening which registers with the hook opening 43 of the shell 40 when the parts are in the open position of FIGURE 5. The hook shank is formed with a reduced neck 55 which is defined at the rear by two forwardly facing shoulders 56 and the front by two rearwardly facing shoulders 57. A hole 58 for button latch 29 is formed in the enlarged rear terminal portion 59 of the hook shank. A pair of strong metal pins 60 or the like which are laterally aligned extend through the shell 40 in the space on either side of the neck 55 between the shoulders 56 and 57. These provide limit stops to limit sliding movement of the hook 51 to the open and closed positions. As in the first species, the bight 41 of the shell is relatively narrow and is concentrically outwardly spaced from the inner edge of the solid metal hook 52, 53 to protect the shell parts from the abrasive action of the anchor cable. The operation of this species of the invention is the same as the first species.

While there has been shown and described what are now thought to be the preferred species of the invention, it should be understood that the same is susceptible of still other forms and expressions. Consequently, it is understood that the invention is not considered to be limited to the precise structures shown and described hereinabove but only as hereinafter claimed.

I claim:

1. In a snaphook of the sliding type including a sheet metal shell having a hook portion comprising a forward bight portion and a laterally disposed bill and a shank portion comprising an inwardly curved forward portion providing a downwardly depending shoulder, said bill and shoulder being spaced to provide a hook opening, a solid metal hook having a shank, a bight portion and a bill portion providing an opening capable of registering with said opening in said shell, said hook being mounted for slidable movement within said shell to a position which closes the opening in said shell and a second position wherein said opening in said hook registers with the opening in said shell, said bight portion of said hook being substantially thicker than said bight of said shell, the inner edges of said bight and bill portions of said hook being disposed in radially inwardly substantially spaced relation to the like edges of said shell at all times; the improvement comprising said hook shank being formed with a pair of laterally aligned and oppositely directed recesses, said recesses having rear ends defined by a pair of forwardly facing shoulders and front ends defined by a pair of rearwardly facing shoulders, laterally spaced rigid stop means fixed to said shell, said stop means extending into said recesses, and said stop means being alternately engageable with said rearwardly and forwardly facing pairs of shoulders to limit sliding movement of said hook relative to said shell in both positions.

2. A snaphook according to claim 1, wherein said rigid stop means comprises a solid metal anchor member fixed in said shell rearwardly of said shank, said anchor member having a pair of laterally spaced and opposed legs extending forwardly in said shell laterally outwardly of said shank, and said legs terminating in integral laterally inwardly directed feet disposed in said recesses.

3. A snaphook according to claim 2, wherein said shell includes rigid means fixedly engageable with said feet of said anchor member to secure the latter in said shell.

4. A snaphook of the sliding type comprising a sheet metal shell having a hook portion including a forward bight portion and a laterally disposed bill and a shank portion including an inwardly curved forward portion providing a downwardly depending shoulder, said bill and shoulder being spaced to provide a hook opening, a solid metal hook having a shank, a bight portion and a bill portion providing an opening capable of registering with said opening in said shell, said hook being mounted for slidable movement within said shell to a position which closes the opening in said shell and a second position wherein said opening in said hook registers with the opening in said shell, said bight portion of said hook being substantially thicker than said bight of said shell, the inner edges of said bight and bill portions of said hook being disposed in radially inwardly substantially spaced relation to the like edges of said shell at all times, said hook having a shank including a forward portion of reduced diameter and a rear terminal portion of enlarged diameter providing a T-shaped formation having a pair of laterally extending shoulders, a solid metal anchor member fixed in said shell rearwardly of said shank, said anchor member having two laterally spaced legs extending forwardly in said shell laterally outwardly of said enlarged terminal portion of said shank, and said legs terminating in integral inwardly directed feet forwardly of said shoulders.

5. A snaphook of the sliding type comprising a sheet metal shell having a hook portion including a bight portion and a laterally disposed bill and a shank portion having an inwardly curved forward portion providing a downwardly depending shoulder, said bill and shoulder being spaced to provide a hook opening, a solid metal hook having a shank, a bight portion and a bill portion, said shank and bill portion providing an opening capable of registering with said opening in said shell, said hook being mounted for slidable movement within said shell to a position which closes the opening in said shell and in a second position wherein said opening in said hook registers with the opening in said shell, said bight portion of said hook being substantially thicker than said bight of said shell, the inner edges of said bight and bill portions of said hook being disposed in radially inwardly substantially spaced relation to the like edges of said shell at all times, said hook having a shank including a forward portion of reduced diameter and a rear terminal portion of enlarged diameter providing a T-shaped formation having a pair of laterally extending shoulders, and a pair of metal pins extending through said shell on opposite sides of said reduced shank portion forwardly of said shoulders to limit the sliding movement of said hook.

References Cited by the Examiner

UNITED STATES PATENTS

| | | | |
|---|---|---|---|
| 659,425 | 10/00 | White | 24—239 |
| 828,823 | 8/06 | Maize | 24—239 |
| 1,201,175 | 10/16 | Grunwald | 24—238 |
| 2,701,402 | 2/55 | Foster | 24—239 |
| 2,764,305 | 9/56 | Reich | 24—238 |
| 2,826,798 | 3/58 | Kahl et al. | 24—238 |
| 3,145,443 | 8/64 | Gallagher | 24—239 |

WILLIAM FELDMAN, *Primary Examiner.*

BOBBY R. GAY, DONLEY J. STOCKING, *Examiners.*